United States Patent Office 3,809,637
Patented May 7, 1974

3,809,637
DEVICE FOR MEASURING AN ACTIVITY OF CUPRIC IONS
Kenji Higashiyama and Hiroshi Hirata, Osaka, Japan, assignors to Matsushita Electric Industrial Co., Ltd., Osaka, Japan
Filed Feb. 28, 1972, Ser. No. 229,911
Claims priority, application Japan, Mar. 2, 1971, 46/11,124, 46/11,125; Mar. 3, 1971, 46/11,408, 46/11,409
Int. Cl. G01n 27/46
U.S. Cl. 204—195 M                               7 Claims

ABSTRACT OF THE DISCLOSURE

A device for measuring an activity of cupric ions comprises a selective electrode and a reference electrode immersed in a solution containing cupric ions, said selective electrode including a disc in a batch composition which comprises a combination of cuprous chalcogenide and at least one member selected from the group consisting of silver telluride and silver selenide or in a batch composition which comprises a combination of silver sulfide and at least one member selected from the group consisting of cuprous telluride and cuprous selenide.

BACKGROUND OF THE INVENTION

The invention relates to a device for measuring an activity of cupric ions and more particularly to a device comprising a selective electrode responsive to the activity of cupric ions and a reference electrode.

Cupric ion activity can be determined by several methods such as chelatometric titration, spectrophotography and polyarography. However, these methods generally requre troublesome pretreatment for the sample before the measurement of cupric ions.

It is desirable for chemical industry to have a device for measuring the activity of cupric ions in a solution without any troublesome pretreatment similar to that of a pH glass electrode for measuring the pH value of solution without any pretreatment of the solution to be tested.

An object of this invention is to provide a device for measuring directly the activity of cupric ions in a solution.

A further object of this invention is to provide such a measuring device characterized by a high sensitivity to cupric ions.

Another object of this invention is to provide a cupric ion measuring device characterized by a high response to the cupric ions.

These and other objects of this invention will be apparent upon consideration of the following detailed description taken together with accompanying drawings.

A device for measuring an activity of cupric ions according to the present invention comprises a selective electrode and a reference electrode immersed in a solution containing cupric ions, whereby only another surface contacts with said solution. Said cupric ion-selective eletrode includes a disc which is in a batch composition comprising a combination of cuprous chalcogenide and at least one member selected from the group consisting of silver telluride and silver selenide, or in a batch composition comprising a combination of silver sulfide and at least one member selected from the group consisting of cuprous telluride and cuprous selenide. Said batch composition according to the present invention achieves a cupric ion-selective electrode having a high sensitivity and a wide application range with pH value in a solution to be tested.

Figure 1:
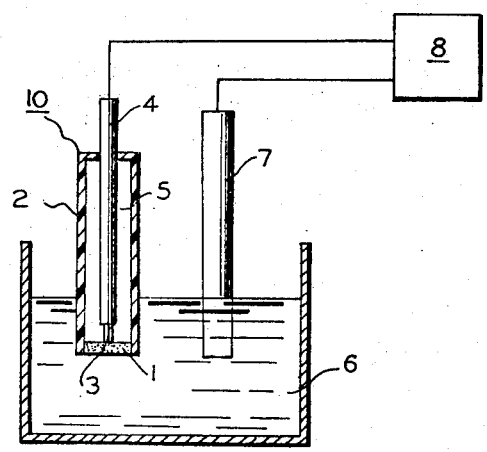
FIG. 1 is a schematic diagram of a device for measuring cupric ions in a solution in accordance with the invention.

Referring to FIG. 1, reference character 10 designates, as a whole, a selective electrode which comprises a discs in a batch composition according to the present invention. Said lead 3 is enveloped by a sealed wire 4. A combination of said disc 1 and said lead 3 partly enveloped by said seal wire 4 is enclosed in a housing 2 so that another surface of said disc 1 contacts with a solution 6. Said housing 2 is filled with an insulating resinous material 5. A reference electrode 7 partly immersed in said solution 6 is electrically connected to one terminal of a voltmeter 8 having a high impedance. Said lead 3 is electrically connected to another terminal of said voltmeter 8.

A variation in the logarithm of the activity of cupric ions in said solution 6 has a substantially linear relation to the variation in the potential between said selective electrode 10 and said reference electrode 7, both being partly immersed in said solution 6. One can use any available and suitable electrode such as a saturated calomel electrode or a silver-silver chloride electrode as said reference electrode 7.

Said disc 1 is in a batch composition comprising a combination of 5–95 wt. percent of cuprous chalcogenide and 5–95 wt. percent of at least one member selected from the group consisting of silver telluride and silver selenide, or in a batch composition comprising a combination of 5–95 wt. percent of silver sulfide and 5–95 wt. percent of at least one member selected from the group consisting of cuprous telluride and cuprous selenide in accordance with the invention.

A batch composition comprising a combination of more than 95 wt. percent of cuprous chalcogenide and less than 5 wt. percent of silver chalcogenide results in a low sensitivity of resultant electrode. A batch composition comprising a combination of less than 5 wt. percent of cuprous chalcogenide and more than 95 wt. percent of silver chalcogenide results in a low sensitivity and a long response time of resultant electrode.

Cuprous chalcogenide referred to herein is defined as cuprous sulfide, cuprous selenide and cuprous telluride.

A batch composition referred to herein is defined as a composition of starting materials before heating.

A better result is obtained by using a batch composition wherein said silver sulfide includes at least one member selected from the group consisting of silver selenide and silver telluride, the weight ratio of said silver sulfide to said one member being in a range from 1 to 10. This batch composition results in a high sensitivity and a short response time of resultant electrode.

A more preferable batch composition comprises a combination consisting essentially of 10 to 30 wt. percent of cuprous telluride and 70 to 90 wt. percent of silver sulfide.

Figure 2:
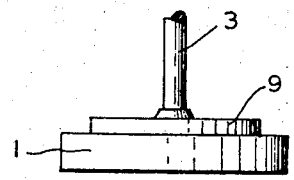
FIG. 2 is a cross sectional view of a disc for use in the device of FIG. 1.

A longer operation life can be obtained by providing said disc with a noble metal electrode such as gold, palladium or platinum electrode. Referring to FIG. 2 a disc 1 has a noble metal electrode 9 applied to one surface thereof. A lead 3 is electrically connected to said noble metal electrode 9 by any available and suitable method such as soldering. Said noble metal electrode 9 can be prepared by, for example, vacuum-depositing of a noble metal film or by applying an available commercially noble metal paint.

The disc for use in said selective electrode can be obtained by heating a pressed body of a mixture of a given batch composition in a non-oxidizing atmosphere in accordance with a conventional ceramic method.

A mixture of starting materials of a fine powder form in a given batch composition according to the present invention is mixed well in a dry method by any suitable and available equipment and is pressed into a disc in a desired form at a pressure of 100 to 20,000 kg./cm.² The pressed disc is heated at a temperature of 100° to 600° C. for time period of 1 to 10 hours preferably in an non-oxidizing atmosphere, such as nitrogen or argon.

The device according to the invention can be reliable used at temperatures from 0° to 95° C. The measured potential versus the logarithm of the activity of cupric ions is substantially linear relation.

Many kinds of diverse ions such as sodium, potassium, calcium, magnesium, nickel, cobalt, aluminum, zinc, lead, cadmium, chloride, sulfate and perchlorate ions are tolerated and may coexist during the measurement of the activity of the cupric ions. However, ferric, silver, mercuric, iodide and sulfide ions should be removed from the solution to be measured.

Example 1

A mixture of 25 wt. percent of cuprous telluride and 75 wt. percent of silver sulfide is mixed well in a dry method and is pressed at a pressure of 10,000–20,000 kg./cm.² into a disc 15 mm. diameter and having a 3 mm. thickness. The pressed disc is heated at 400° C. for 2 hours in purified nitrogen gas stream having a flow rate of 0.2 l./ml. The sintered disc is polished, at both surfaces, with silicon carbide abrasive and then with diamond paste into a thickness of 2 mm. The polished disc is provided, at one surface, with a gold electrode which is obtained from Du Pont gold paint #8115. The polished disc is connected, at the gold electrode, to a lead partly enveloped by a sealed wire and is mounted in a housing of polyvinyl chloride resin. The housing is filled with epoxy resin so as to build a selective electrode as shown in FIG. 1. A combination of the selective electrode and a saturated calomel electrode as a reference electrode is immersed in an aqueous solution of pure cupric nitrate at 25° C. The potential between the selective electrode and the calomel electrode is measured by a voltmeter for use in a pH meter.

The device measures the activity of cupric ions with a high sensitivity as shown in Table 1.

TABLE 1

| Activity of cupric ions, M: | Potential, mv. |
|---|---|
| $10^{-1}$ | 20 |
| $10^{-2}$ | −9 |
| $10^{-3}$ | −38 |
| $10^{-4}$ | −67 |
| $10^{-5}$ | −96 |
| $10^{-6}$ | −126 |
| $10^{-7}$ | −156 |
| $10^{-8}$ | −175 |

Example 2

A device for measuring the activity of cupric ions is prepared in a manner similar to that of Example 1. A disc of Example 2 includes cuprous sulfide and silver telluride. The preparation of the disc is similar to that of Example 1. The potential between the selective electrode and a calomel electrode in the aqueous solution of pure cupric nitrate is measured with the same procedure described in Example 1. The device measures the activity of cupric ions with a high sensitivity as shown in Table 2.

TABLE 2

| Activity of cupric ions, M | Potential, mv. | | | |
|---|---|---|---|---|
| | 1:99* | 5:95* | 25:75* | 90:10* |
| $10^{-1}$ | 7 | 11 | −12 | 18 |
| $10^{-2}$ | −10 | −18 | −17 | −10 |
| $10^{-3}$ | −30 | −46 | −46 | −40 |
| $10^{-4}$ | −52 | −75 | −75 | −69 |
| $10^{-5}$ | −75 | −104 | −105 | −98 |
| $10^{-6}$ | −92 | −133 | −134 | −126 |
| $10^{-7}$ | −103 | −161 | −162 | −148 |
| $10^{-8}$ | −103 | −165 | −178 | −162 |

* Weight ratio of cuprous sulfide:silver telluride.

Example 3

The device for measuring the activity of cupric ions is prepared in a manner similar to that of Example 1. A disc of Example 3 is in a composition of a mixture of the starting materials, cuprous selenide and silver sulfide. The preparation of the disc is similar to that of Example 1. The potential between the selective electrode and a saturated calomel electrode in an aqueous solution of pure cupric nitrate is measured by the same procedure described in Example 1. The device measures the activity of cupric ions with a high sensitivity as shown in Table 3.

TABLE 3

| Activity of cupric ions, M | Potential, mv. | | | | |
|---|---|---|---|---|---|
| | 1:99* | 5:95* | 25:75* | 60:40* | 90:10* |
| $10^{-1}$ | 14 | 16 | 23 | 24 | 29 |
| $10^{-2}$ | −3 | −10 | −2 | −2 | 4 |
| $10^{-3}$ | −24 | −38 | −31 | −28 | −22 |
| $10^{-4}$ | −43 | −66 | −60 | −57 | −48 |
| $10^{-5}$ | −68 | −93 | −89 | −87 | −75 |
| $10^{-6}$ | −79 | −117 | −118 | −115 | −95 |
| $10^{-7}$ | −88 | −138 | −132 | −135 | −99 |
| $10^{-8}$ | −93 | −143 | −138 | −140 | −99 |

*Weight ratio of cuprous selenide:silver sulfide.

Example 4

The device for measuring the activity of cupric ions is prepared in a manner similar to that of Example 1. A disc of Example 4 is in a composition of a mixture of the starting materials, cuprous telluride and silver selenide. The preparation of the disc is similar to that of Example 1. The potential between the selective electrode and a saturated calomel electrode in an aqueous solution of pure cupric nitrate is measured by the same procedure described in Example 1. The device measures the activity of cupric ions with a high sensitivity as shown in Table 4.

TABLE 4

| Activity of cupric ions, M | Potential, mv. | | | | |
|---|---|---|---|---|---|
| | 1:99* | 5:95* | 25:75* | 60:40* | 90:10* |
| $10^{-1}$ | −5 | 5 | 10 | 13 | 20 |
| $10^{-2}$ | −25 | −23 | −17 | −13 | −3 |
| $10^{-3}$ | −46 | −29 | −46 | −37 | −27 |
| $10^{-4}$ | −68 | −78 | −75 | −66 | −56 |
| $10^{-5}$ | −93 | −107 | −104 | −96 | −84 |
| $10^{-6}$ | −113 | −136 | −133 | −125 | −113 |
| $10^{-7}$ | −121 | −163 | −160 | −153 | −127 |
| $10^{-8}$ | −123 | −173 | −178 | −163 | −127 |

*Weight ratio of cuprous telluride:silver selenide.

Example 5

The device for measuring the activity of cupric ions is prepared in a manner similar to that of Example 1. A disc of Example 5 is in a composition of a mixture of the starting materials, cuprous selenide and silver selenide. The preparation of the disc is similar to that of Example 1. The potential between the selective electrode and a saturated calomel electrode in an aqueous solution of pure cupric nitrate is measured by the same procedure described in Example 1. The device measures the activity of cupric ions with a high sensitivity as shown in Table 5.

TABLE 5

| Activity of cupric ions, M | Potential, mv. | | | | |
|---|---|---|---|---|---|
| | 1:99* | 5:95* | 25:75* | 60:40* | 90:10 |
| $10^{-1}$ | −1 | 10 | 17 | 20 | 21 |
| $10^{-2}$ | −20 | −8 | −11 | −7 | −5 |
| $10^{-3}$ | −34 | −35 | −40 | −35 | −31 |
| $10^{-4}$ | −57 | −64 | −70 | −64 | −59 |
| $10^{-5}$ | −79 | −93 | −99 | −93 | −85 |
| $10^{-6}$ | −100 | −122 | −127 | −122 | −99 |
| $10^{-7}$ | −103 | −145 | −138 | −138 | −101 |
| $10^{-8}$ | −107 | −163 | −148 | −148 | −101 |

*Weight ratio of cuprous selenide:silver selenide.

Example 6

A device for measuring the activity of cupric ions is prepared in a manner similar to that of Example I. A disc of Example 6 includes 25 wt. percent of cuprous telluride, 35 wt. percent of silver selenide and 40 wt. percent of silver sulfide. The preparation of the disc is similar to that of Example 1. The potential between the selective electrode and a saturated calomel electrode in an aqueous solution of pure cupric nitrate is measured with the same procedure described in Example 1. The device measures the activity of cupric ions with a high sensitivity as shown in Table 6.

TABLE 6

| Activity of cupric ions M: | Potential, mv. |
|---|---|
| $10^{-1}$ | −3 |
| $10^{-2}$ | −31 |
| $10^{-3}$ | −59 |
| $10^{-4}$ | −88 |
| $10^{-5}$ | −117 |
| $10^{-6}$ | −146 |
| $10^{-7}$ | −175 |
| $10^{-8}$ | −195 |

Example 7

A device for measuring the activity of cupric ions is prepared in a manner similar to that of Example 1. A disc of Example 7 includes 15 wt. percent of cuprous sulfide, 15% of cuprous telluride, 50% of silver sulfide and 20% of silver selenide as the starting materials. The preparation of the disc is similar to that of Example 1. The potential between the selective electrode and a saturated calomel electrode in an aqueous solution of cupric nitrated is measured with the same procedure described in Example 1. The device measures the activity of cupric ions with a high sensitivity as shown in Table 7.

TABLE 7

| Activity of cupric ions, M: | Potential, mv. |
|---|---|
| $10^{-1}$ | −15 |
| $10^{-2}$ | −40 |
| $10^{-3}$ | −68 |
| $10^{-4}$ | −97 |
| $10^{-5}$ | −127 |
| $10^{-6}$ | −156 |
| $10^{-7}$ | −182 |
| $10^{-8}$ | −195 |

Example 8

A device for measuring the activity of cupric ions is prepared in a manner similar to that of Example 1. A disc of Example 8 includes 10 wt. percent of cuprous selenide, 15% of cuprous telluride and 75% of silver sulfide as the starting materials. The preparation of the disc is similar to that of Example 1. The potential between the selective electrode and a saturated calomel electrode in an aqueous solution of cupric nitrate is measured with the same procedure described in Example 1. The device measures the activity of cupric ions with a high sensitivity as shown in Table 8.

TABLE 8

| Activity of cupric ions, M: | Potential, mv. |
|---|---|
| $10^{-1}$ | −20 |
| $10^{-2}$ | −48 |
| $10^{-3}$ | −76 |
| $10^{-4}$ | −106 |
| $10^{-5}$ | −135 |
| $10^{-6}$ | −165 |
| $10^{-7}$ | −191 |
| $10^{-8}$ | −204 |

What is claimed is:

1. A device for measuring the activity of cupric ions, comprising a selective electrode and a reference electrode which are coupled through a potential measuring apparatus, said selective electrode including a disc which in a batch composition comprises a combination of cuprous chalcogenide and at least one member selected from the group consisting of silver telluride and silver selenide.

2. A device for measuring the activity of cupric ions as defined in claim 1, wherein said batch composition comprises a combination of 5–60 wt. percent of cuprous chalcogenide and 40–95 wt. percent of at least one member selected from the group consisting of silver telluride and silver selenide.

3. A device for measuring the activity of cupric ions as defined in claim 2, wherein said cuprous chalcogenide is at least one member selected from the group consisting of cuprous sulfide, cuprous selenide and cuprous telluride.

4. A device for measuring the activity of cupric ions, comprising a selective electrode and a reference electrode which are coupled through a potential measuring apparatus, said selective electrode including a disc which in a batch composition comprises a combination of silver chalcogenide and at least one member selected from the group consisting of cuprous selenide and cuprous telluride.

5. A device for measuring the activity of cupric ions as defined in claim 4, wherein said batch composition comprises a combination of 40–95 wt. percent of silver chalcogenide and 5–60 wt. percent of at least one member selected from the group consisting of cuprous telluride and cuprous selenide.

6. A device for measuring the activity of cupric ions as defined in claim 4, wherein said silver chalcogenide is at least one member selected from the group consisting of silver sulfide, silver selenide and silver telluride.

7. A device for measuring the activity of cupric ions as defined in claim 4, wherein said combination is 10–30 wt. percent of cuprous telluride and 70–90 wt. percent of silver sulfide.

References Cited

UNITED STATES PATENTS

| 3,591,464 | 7/1971 | Frant et al. | 204—1 T |
| 3,669,862 | 6/1972 | Hirata et al. | 204—195 M |

TA-HSUNG TUNG, Primary Examiner

U.S. Cl. X.R.

204—1 T